DEVICE RELATIVE TO COLOR TELEVISION

Filed May 10, 1950 6 Sheets-Sheet 1

INVENTOR:
PAUL M. ROEPER
By Wenderoth, Lind & Ponack
ATTORNEYS

Inventor:
Paul M. Roeper
By Wenderoth, Lind & Ponack
Attys.

INVENTOR:
PAUL M. ROEPER
By Wenderoth, Lind & Ponack
ATTORNEYS

March 25, 1952

P. M. ROEPER 2,590,350

DEVICE RELATIVE TO COLOR TELEVISION

Filed May 10, 1950

6 Sheets-Sheet 4

INVENTOR:
PAUL M. ROEPER
By Wenderoth, Lind & Ponack
ATTORNEYS

INVENTOR:
PAUL M. ROEPER
By Wenderoth, Lind & Ponack
ATTORNEYS

Inventor:
Paul M. Roeper
By Wenderoth, Lind & Ponack
Attys

Patented Mar. 25, 1952

2,590,350

UNITED STATES PATENT OFFICE 2,590,350

DEVICE RELATIVE TO COLOR TELEVISION

Paul M. Roeper, Paris, France

Application May 10, 1950, Serial No. 161,116
In France May 14, 1949

4 Claims. (Cl. 178—5.2)

My invention relates to a television transmission system and in particular to devices for simultaneously transmitting a plurality of color analytical pictures and also assembling them simultaneously.

In order to reduce the frequency bandwidth requisite for a highly accurate transmission of a colour television transmission, in case of using simultaneous tri-color analytical pictures transmission, and taking into account that the resolving power of human eye is not the same for various colours, it has been suggested to reduce the bandwidth of the signal representing one or two components out of the three which are transmitted. Thus, by means of filters, some of the components, for instance the red and the blue, are intentionally truncated, and only the green signal is transmitted with high degree of definition, or a composite signal comprising a mixture of the green, the red and the blue. Although the total bandwidth of a three-chromatic signal is thus reduced, one is still obliged to transmit simultaneously three video frequency signals.

It is the main object of my invention to reduce the number of transmitted color component pictures with respect to the number of analyzed color component pictures and to replace each of the non-transmitted color component pictures by audio signals.

Another object of my invention is to restore at the receiving station the non-transmitted color component pictures from the transmitted color component pictures and audio signals.

Another object of my invention is to associate the components corresponding to the different analyzed colors in uniting them through one or several approximate relationships, and then to actually transmit only a number of components equal to the difference between the total number of analyzed components and the number of relationships thus established.

Another object of my invention is to transmit particular audio-frequency correction signals giving the approximation admitted in establishing the aforementioned relationships between the color analytical pictures and permitting the restoring of the non-transmitted color pictures.

It has been ascertained that if, from the chromatic point of view, a television image must be defined point by point—at least for certain colours—on the contrary the data concerning the illumination of the image are usually very much the same for large portions thereof. From the point of view of illumination an image can be reduced to a certain number of blots. In a coloured image no shadow effect is to be aimed at, which is the only means of a black-and-white transmission. A coloured image may be very uniform from the point of view of brilliancy variation, without loosing anything of its rchness. It may be mentioned that the eye is very exacting as far as the coloration is concerned, but it is awfully complacent with regard to the appreciation of illumination.

Taking into account this experimental observation, it will be assumed, as the first approximation, that the brilliancy of the image to be televised has a constant value. It results therefrom that, for instance in a three-chromatic transmission, the sum of the three video frequency signals is a constant one. Out of three video frequency signals only two will be transmitted, and at the reception the non-transmitted signal will be re-established by subtracting the sum of the two transmitted signals from a fixed voltage representing the constant sum of the three video signals. At the same time, in order to take into account the approximation admitted, a low frequency signal will be transmitted which embodies the variation of the illumination and which represents the difference between the real brilliancy of the transmitted portion and the constant brilliancy chosen at will. At the reception this signal will control the gain of the video frequency amplifiers relative to each component.

To sum up, the invention comprises the following novel features of the method:

As far as the transmission is concerned:

(1) Departing from the component voltages R, V, B, respectively for the red, the green and the blue, supplied by three selective iconoscopes, three voltages $r$, $v$, $b$, are obtained such that:

$$r+v+b=g_0F_0=K \qquad (1)$$

($K$=constant) and which would correspond to an image chromatically equivalent to the real image ($r/v=R/V$, etc. . . .) and each surface portion of which would have a constant brilliancy chosen at will. This corresponds to a constant flux $F_0$.

Three amplifiers of a suitable gain $g$ will perform the passage of the signals R, V, B into the signals $r$, $v$, $b$, corresponding to a constant brilliancy. We shall have:

$$g.R=r$$
$$g.V=v$$
$$g.B=b$$

what leads, by summing up, to:

$$gF=r+v+b=g_0F_0=K$$

wherein:

$$F=R+V+B$$

This leads to:

$$g=\frac{g_0F_0}{F}=K_F \qquad (2)$$

It will be noted that the gain of these amplifiers must follow a hyperbolic law in F (Equation 2); it will be preferred, according to the invention, to use amplifiers the gain of which follows a linear law, and which are controlled by a D. C. bias voltage $v_g$ varying in a hyperbolic relationship with F.

(2) A correction signal c is produced representing the difference between the brilliancy chosen above, and to which corresponds the flux $F_0$, and the real brilliancy which would have the image if it were reproduced accurately from the point of view of the brilliancy. Otherwise speaking the signal $c$ (Figure 7$b$) represents the variations of the mean value of the flux $F-F_0$ during a suitable time interval $t$, $t+dt$, but the frequency of these variations is restricted, by means of a filter, to, say, some scores of kc./s.

As far as the channels are concerned:

(3) A radical suppression of one channel. If the three fundamental colours are the green, the red and the blue, the transmission of the red, for instance, will be suppressed.

(4) A transmission of the signal c the variations of which are low frequency ones, and correspond to transmission of a very rough image. If the transmission comprises an audio channel, this signal can be transmitted simultaneously by the audio transmitter. For instance: the use of one side-band for the audio, and of the other side-band for the signal $c$; or amplitude modulation of the carrier wave by $c$, and frequency modulation by the audio signal, or any other combination which can be easily imagined by a man skilled in the art.

If the transmission is carried out without using an audio channel, and if the synchronisation signals of the line and of the image are transmitted, for instance, by the green channel, the advantage will be taken of the fact that the places of these signals are free, say, in the blue channel. Thus, a certain gap is available after each line and after each blue image, and this gap can be used for pulse modulation transmission of the signal $c$.

As far as the reception is concerned:

(5) Reconstitution of the non-transmitted component (the red) departing from a fixed reference voltage K assumed and determined in the range of chosen standards. K will depend from the choice of $F_0$:

$$K=g_0.F_0=F_0/g_0'$$

wherein $g_0$ is the particular value of the gain at the transmission corresponding to $c=0$ and given by the Equation 2, and $g_0'$ is the particular value of the gain at the reception corresponding to the same value of $c$ and given by the Equation 3 hereunder.

(6) Departing from the received voltages $v$ and $b$, and from the reconstituted voltage $r$, obtention of the three voltages V, B and R such that:

$$g'r=R$$
$$g'v=V$$
$$g'b=B$$

what gives, by summing up:

$$g'(r+v+b)=g'K=F$$

whence:

$$g'=\frac{F}{K}=\frac{g_0'F}{F_0} \qquad (3)$$

It will be noted that the gain $g'$ of the reception amplifier must follow a linear law in F (or in $c$ which is proportional to the former).

Before passing to a detailed description of the device properly speaking, it is advisable to make the following remark:

If one considers the locus of the spectrum in the chromatic diagram defined by the International Illumination Commission (denoted hereunder by abbreviation I. I. C.), there is, obviously, an interest to choose such fundamental colours which, although corresponding to sufficiently transparent filters, form an equilateral Maxwell's triangle of the greatest possible surface. In particular, it is possible to draw inside the Maxwell's triangle the loci of the points corresponding to the colours for which the proportion of the blue is the same; it is possible to demonstrate that these loci are straight lines. Taking into consideration that in the nature the proportion of the blue is relatively a very restricted one—for more than two thirds of coloured points the share of the blue is less than 10%—and that, moreover, in the same image one finds mostly the same blue, it will be admitted that the probability of variation of the blue signal will be much lesser than that of the green. For this reason the blue video frequency signal can be truncated as far as its high frequencies are concerned, as this has already been suggested.

To conclude, instead of transmitting for each point of the image, and this through three identical wide band channels, the signals corresponding to the shares of the blue, of the green and of the red, an equipment will be materialized characterised by transmission of:

A signal representing the share of the green and which may be compared with the black-and-white signals of conventional systems;

A signal representing the share of the blue, but with a reduced definition;

A correction signal $c$ of a relatively low frequency and which represents the variation of the illumination.

Although the invention has been described with reference to a three-chromical transmission, it is not at all restricted to this particular case, as it will result from what will be exposed hereunder.

In order to give some examples of the embodiment of the invention, three transmitter-receiver systems will be described hereunder, the first one relative to a three-chromical transmission comprising a transmission of only two coloured components and of a low-frequency correction signal, the second one relative to a tetra-chromical transmission comprising a transmission of only two coloured components and of two low-frequency correction signals, and the third one relative to a three-chromical transmission comprising a transmission of only one coloured component and of two low-frequency correction signals.

The description will be made with reference to the accompanying drawings in which:

Figure 1 represents the chromatic diagram of the International Illumination Commission as plotted on the axes suggested by Mr. W. D. Wright in "The Measurement of Colour" (Higer, London 1946);

Figure 2:
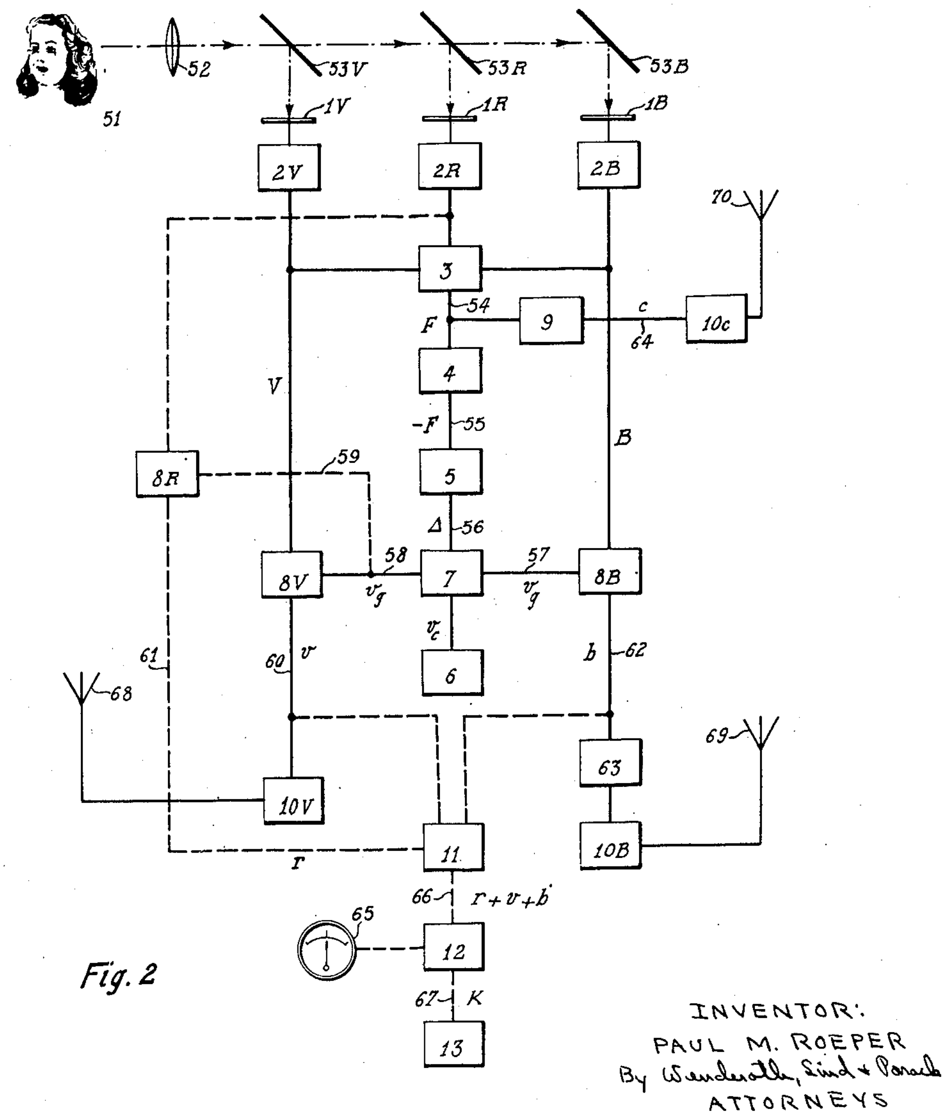
Figures 2 and 4 represent the transmitter and the receiver relative to the above first system.

Referring now to Figure 2, the image 51 to televise is sent through the objective 52 to the three mirrors 53V, 53R, 53B the first two of which are partially silvered mirrors, and the last of which is a fully silvered one.

$1_V$, $1_R$, $1_B$ are the chromatic filters which will be supposed to be, for instance, the Wratten filters, and namely No. 58 for the green, No. 25 for the red, and No. 47 for the blue.

2V, 2R, 2B are the cameras which may comprise any suitable types of image signal generators known to the art, such as the "iconoscope," "orthicon" or "image dissector" types of camera tubes and incorporate video-frequency amplifiers the gain of which may be adjusted to a suitable value before the transmission. At will, the three cameras may be comprised in the same box. The video frequency signals V, R, B are collected at the output of the three cameras, and have the general outline of Figure 7a.

3 is an adding circuit which enables to sum up the instantaneous values of the signals V, R, B, and which may be constituted, for instance, by three simple resistors connected in a serial arrangement. In this manner the signal $$F=V+R+B$$

is obtained, at every instant, through lead 54.

4 is a phase-inverter circuit enabling to change the polarity of F. This result may be obtained, for instance, by a tube having a rectilinear characteristic. The signal $-F$ will thus appear through lead 55.

5 is a circuit comprising substantially a tube having a hyperbolic control-grid voltage plate-current characteristic. The A. C. signal $-F$ is fed to the control grid together with a D. C. bias voltage proportional to the peak value of A. C. signal $-F$ taken from a diode restorer circuit. There will result a video output signal $$\Delta=\frac{-\xi}{-F}$$

wherein $\xi$ denotes a constant quantity, i. e. a video $\Delta$ output signal having a value inversely proportional to the video input signal. By suitably adjusting the grid-leak resistance value of the hyperbolic characteristic tube, constant $\xi$ is made equal to $g_0F_0$. Signal $\Delta$ is available upon lead 56.

Figure 3A:
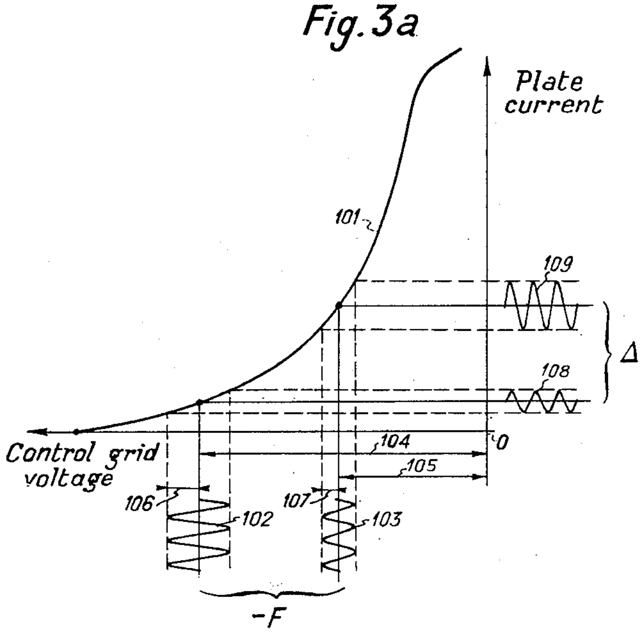
Figures 3a and 3b represent the grid control voltage plate current characteristic curves having an hyperbolic shape in case of Figure 3a and a parabolic shape in case of Figure 3b.

Referring to Fig. 3a, 101 represents the grid-control voltage plate current characteristic of the tube of circuit 5 which has an hyperbolic shape. Said tube may be, for example, a 6SG7 tube. 102, 103 denotes the A. C. input signal $-F$. The reinserted D. C. bias voltage is 104 when the input signal has a peak value 106, and is 105 when the input voltage is 107. If it is assumed that peak values 106 and 107 are sufficiently small so as signals 102 and 103 will be linearly amplified, output signals 108 and 109 will be respectively inversely proportional to input signals 102 and 103.

Figure 3B:
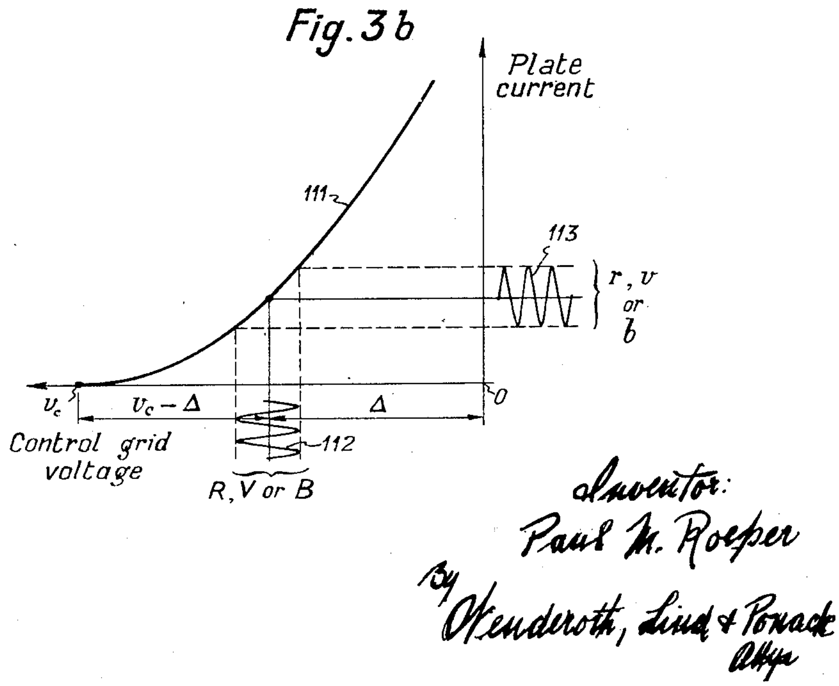

$8_V$, $8_R$ and $8_B$ are amplifiers having a linear gain i. e. a parabolic grid control voltage plate current characteristic curve. Such a tube may be, for example, a 6AU6 tube and its charactertic curve is represented by 111 of Fig. 3b. $v_c$ is the cut-off voltage. Output signals V, R, B from cameras 2V, 2R, 2B are respectively applied on the control grid of amplifiers $8_V$, $8_R$, $8_B$ together with control bias voltage $v_g=v_c-\Delta$ and one among them is represented by 112. Amplifier output signals $rvb$ are represented by 113 of Fig. 3b and have amplitudes which are proportional to $v_g$ according to the parabolic shape of curve 111. Otherwise speaking video signals $r$, $v$, $b$ are in hyperbolic relationship with F and in linear relationship respectively with R, V, B.

$$v=gV=\frac{g_0F_0V}{F}$$

The same is true for $r$ and $b$ and whichever are the components V, R, B (except if they have all at a time a zero value), one will always have $$v+r+b=g_0F_0=K=\text{constant}$$

i. e. the Equation 1.

6 is a constant voltage source, for instance, a battery having a voltage $V_c$.

7 is a subtracting circuit which gives:

$$v_g=v_c-\Delta$$

which is the bias voltage of the grids of amplifiers $8_V$, $8_R$ and $8_B$.

The signal $v_g$ appears then upon leads 57, 58, 59.

Figure 7C:
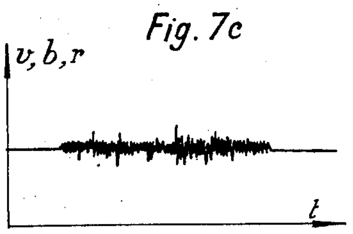

The signal $v$ appears upon lead 60, the signal $r$ upon lead 61, and the signal $b$ upon lead 62. These signals are represented on Figure 7c.

$10_V$ is a conventional television transmitter channeling the signal $v$, i. e. the green.

$10_B$ is a transmitter forming the blue channel transmitting the signal $b$; the bandwidth of this channel can be reduced by means of the filter 63, in a known manner. The signal $r$ is not transmitted, and is obtained only in view of feeding to the same to a control device which will be described later on.

Figure 7B:
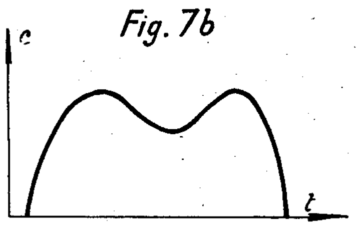

9 is a low-pass filter to which signal F is fed at the output of 3, said signal being no other thing than the black-and-white signal; this filter passes through only the variations of F which are lower than a certain frequency, for example 50,000 c./s. The signal $c$ of Figure 7b appears upon lead 64.

$10_c$ is the transmitter provided with a reduced bandwidth corresponding to only few blots per image, and which transmits the signal $c$. As it has been already mentioned $10_c$ can form a particular channel of an audio transmission.

In Figure 2, 68, 69, 70 represent the three transmission antennae fed respectively by the transmitters $10_V$, $10_B$ and $10_c$. Obviously the two latter antennae can be embodied in one single antenna and the two components $v$ and $b$ can be transmitted upon two subcarrier frequencies of a single carrier frequency as it is disclosed in U. S. Patent No. 2,335,180 to A. N. Goldsmith.

The dashed lines indicate an additional equipment which may be introduced in order to ascertain that the Equation 1 is satisfied.

11 is a adding circuit for summing up the voltages $v$, $r$, $b$. The signal $v+r+b$ appears then upon lead 66.

13 is a constant voltage source giving the reference voltage K which is available on lead 67.

12 is a subtracting circuit for subtracting from the voltages K, the total voltage $v+r+b$. 65 is a zero voltmeter which controls the voltage supplied by 12, and the hand of which is showing zero when the Equation 1 is satisfied.

These various members are not directly necessary for the transmission, and they can be done away with in all the equipments where the saving on weight is an essential factor.

Figures 4, 7A:
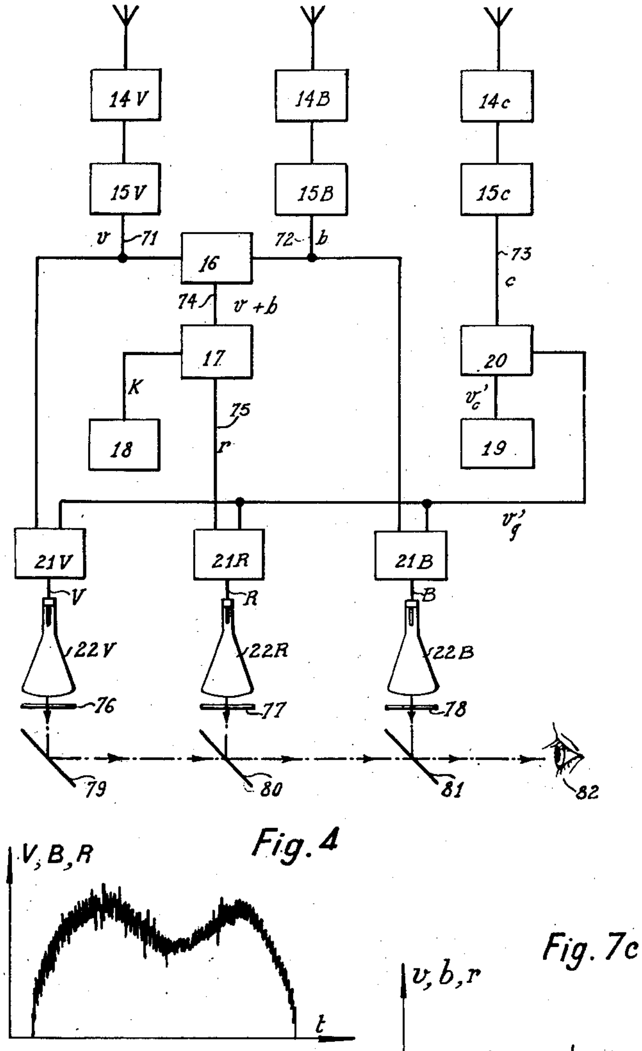
Figures 7a, 7b and 7c represent the signal shapes in various points of the transmitting and receiving devices.

The reception device is represented in Figure 4.

14$_V$, 14$_B$, 14$_c$ are the receivers corresponding respectively to 10$_V$, 10$_B$, 10$_c$, i. e. to the green signal, to the blue signal, and to the correction signal.

15$_V$, 15$_B$, 15$_c$ are adjustable gain amplifiers. The signals $v$, $b$, $c$ are respectively available upon leads 71, 72, 73.

16 is a adding circuit giving, at each instant, the sum $v+b$. The signal $v+b$ appears upon lead 74.

17 is a subtracting circuit which subtracts $v+b$ from the voltage $K=g_0F_0$ supplied by the constant voltage source 18. 17 puts out the signal $r$ which becomes available upon lead 75.

20 is a subtracting circuit which subtracts the voltages $v_c'$ supplied by the source 19, to $c$, thus giving:

$$v_g'=v_c'-c$$

wherein $v_g$ is the control grid voltage and $V_c'$ is the cut-off voltage of linear gain amplifiers 21$_V$, 21$_R$ and 21$_B$.

21$_V$, 21$_R$ and 21$_B$ are three linear gain amplifiers identical to amplifiers 8$_V$ and 8$_B$ of Figure 2 which receive upon their control grids signals $v$, $r$ and $b$ said grids being biased by voltage $v_g'$. Under these conditions, video output signals V, R and B from amplifiers 21$_V$, 21$_R$ and 21$_B$ are in linear relationship with $c$ and consequently with F according to the requirement of Equation 3.

22$_V$, 22$_R$ and 22$_B$ are three kinescopes having screens selectively producing light in the green, red or blue portions of the spectrum. Minimal colour filters 76, 77, 78 are provided so as to insure that the spectral quality of output of each of the tubes is suitable for recombining the three colour images into a single image in which the component colours faithfully reproduce the colours of the original object 51.

One wholly silvered mirror 79, and two partially-silvered mirrors 80 and 81 are provided and arranged with respect to the reproducer tubes 22$_V$, 22$_R$ and 22$_B$ so as to bring the three images from the reproducer tubes into exact registration with respect to the eye of the observer at 82.

A chromoscope can be used instead of the three tubes 22$_V$, 22$_R$ and 22$_B$.

The advantages of the described transmission are, amongst others, that the probabilities are reduced for the three components to undergo an unequal phase delay during the propagation, since only two of these components are transmitted, and furthermore the possibility of obtaining separately the green signal in a black-and-white signal.

Figure 1:
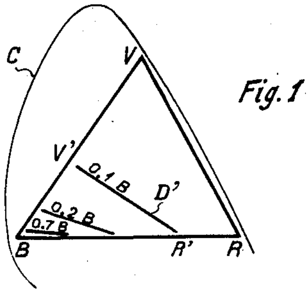

Reconsidering now once more the I. I. C. chromatic diagram Figure 1, and if one observes the relative positions of the locus of the spectrum C and of the triangle RVB defined above, it will become clear that no trichrome system, whichever may be its type, is capable of reproducing the full range of spectral colours. In fact, even if the straight line RV is practically coinciding with the locus C of the spectrum, on the contrary the straight line VB greatly deviates therefrom. This incapacity is confirmed by experience (Maxwell's colorimeter). This explains an incomparably higher compliancy of tetrachromic methods.

In case of a tetrachromic transmission, two pairs of colours are formed, for instance, on the one hand, yellow and blue, and, on the other hand, green and red, an assumption is made that:

$$r+v=K_1$$
$$b+y=K_2$$

Only two components are transmitted, for instance the green and the blue, as well as two correction signals $c_1$ and $c_2$, the first one representing the difference between the total flux $$F_1=V+R$$

corresponding to the first pair of colours, and the value $F_{10}$ of this flux, assumed to be a constant quantity, and the second one representing the difference between the total flux $F_2=Y+B$ corresponding to the second pair of colours, and the value $F_{20}$ of this flux, assumed to be a constant quantity.

Be $g_1$ the gain of the transmitter amplifiers giving the signals $v$ and $r$ ($r$ being not transmitted, the amplifier of the red channel is not indispensable):

$$g_1V=v$$
$$g_1R=r$$

whence:

$$g_1(V+R)=v+r=g_{10}F_{10}=K_1$$

wherein $F_{10}$ is the reference flux corresponding to the green and red colours, and which is supposed to have a constant value.

Be $g_2$ the gain of the transmitter amplifiers giving the signals $b$ and $y$ ($y$ being not transmitted, the amplifier of the yellow channel is not indispensable):

$$g_2B=b$$
$$g_2Y=y$$

whence:

$$g_2(B+Y)=b+y=g_{20}F_{20}=K_2$$

wherein $F_{20}$ is the reference flux corresponding to the blue and yellow colours, and which is supposed to have a constant value.

We shall have:

$$g_1=\frac{g_{10}F_{10}}{F_1} \text{ wherein } F_1=V+R$$

$$g_2=\frac{g_{20}F_{20}}{F_2} \text{ wherein } F_2=B+Y$$

Figure 5:
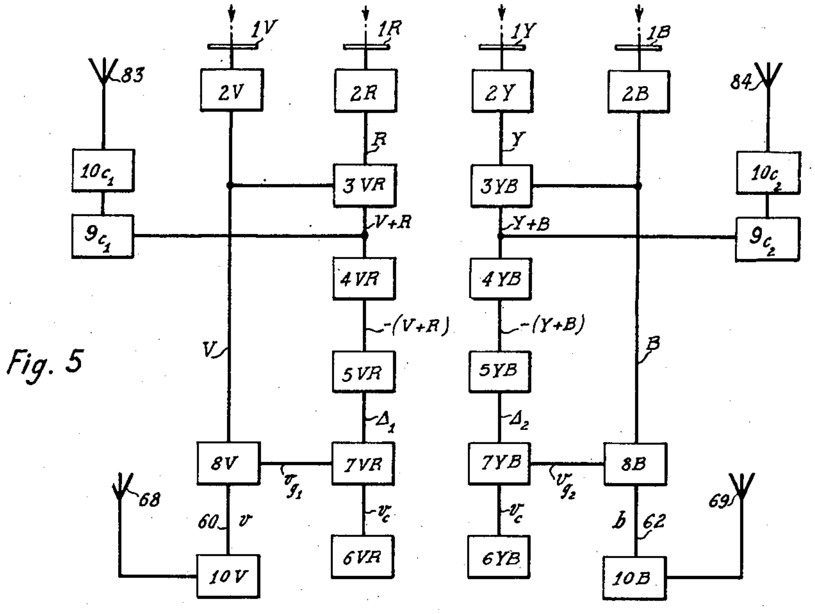
Figures 5 and 6 represent the transmitter and the receiver devices relative to the second proposed system.

The transmitter device is represented in Figure 5.

1$_V$, 1$_R$, 1$_Y$, 1$_B$ are the chromatic filters corresponding respectively to the colours: green, red, yellow and blue.

2$_V$, 2$_R$, 2$_Y$, 2$_B$ are the cameras comprising video-frequency amplifiers.

3$_{VR}$ and 3$_{YB}$ are the phase converting circuits enabling to sum up, on the one hand, the green and red components, and, on the other hand, the yellow and blue components.

4$_{VR}$ and 4$_{YB}$ are the contrivances enabling to change respectively the polarity of $(V+R)$ and $(Y+B)$ signals.

5$_{VR}$ and 5$_{YB}$ are circuits identical to 5 in Figure 2, and which supply respectively the signals $\Delta_1$ and $\Delta_2$ inversely proportional to the input signals $-(V+R)$ and $-(Y+B)$.

6VR and 6YB are constant voltage sources giving a fixed voltage $v_c$ equal to the cut-off voltage of the input stages of amplifiers 8V and 8B.

7VR and 7YB are subtracting circuits which subtract $\Delta$ from $v_c$ on the one hand, and $\Delta_2$ from $v_c$ on the other hand, so as to obtain:

$$v_{g_1}=v_c-\Delta_1$$
$$v_{g_2}=v_c-\Delta_2$$

8V and 8B are amplifiers identical to amplifiers 8V and 8B in Figure 2, and the gains $g_1$ and $g_2$ of which respectively controlled by $v_{g_1}$ and $v_{g_2}$ stand in a linear relationship with $v_{g_1}$ and $v_{g_2}$, i. e. in hyperbolic relationship with $F_1$ and $F_2$.

At the output of 8V the signal is:

$$v=g_1V=\frac{g_{10}F_{10}}{F_1} \text{ (lead 60)}$$

At the output of 8B the signal is:

$$b=g_2B=\frac{g_{20}F_{20}}{F_2} \text{ (lead 62)}$$

10V and 10B are conventional television transmitters which respectively transmit through antennae 68 and 69, the components $v$ and $b$. The transmission of these components can be made on two different carrier frequencies or on two subcarriers of the same carrier frequency.

9$c_1$ and 9$c_2$ are the low-pass filters to which are respectively fed the output signals of 3VR and of 3YB, and which let to pass only the variations of $F_1$ and $F_2$ the frequency of which is lower than a certain cut-off frequency, for instance 50,000 c./s.

10$c_1$ and 10$c_2$ are reduced bandwidth transmitters corresponding to only few blots per image, and transmitting respectively the signal $c_1$ giving the difference between $F_1$ and $F_{10}$, and the signal $c_2$ giving the difference between $F_2$ and $F_{20}$. 10$c_1$ feeds the aerial 83, and 10$c_2$ feeds the aerial 84. Obviously, as heretofore, $c_1$ and $c_2$ can form audio channels, if the latter has a sufficiently wide bandwidth.

Figure 6:
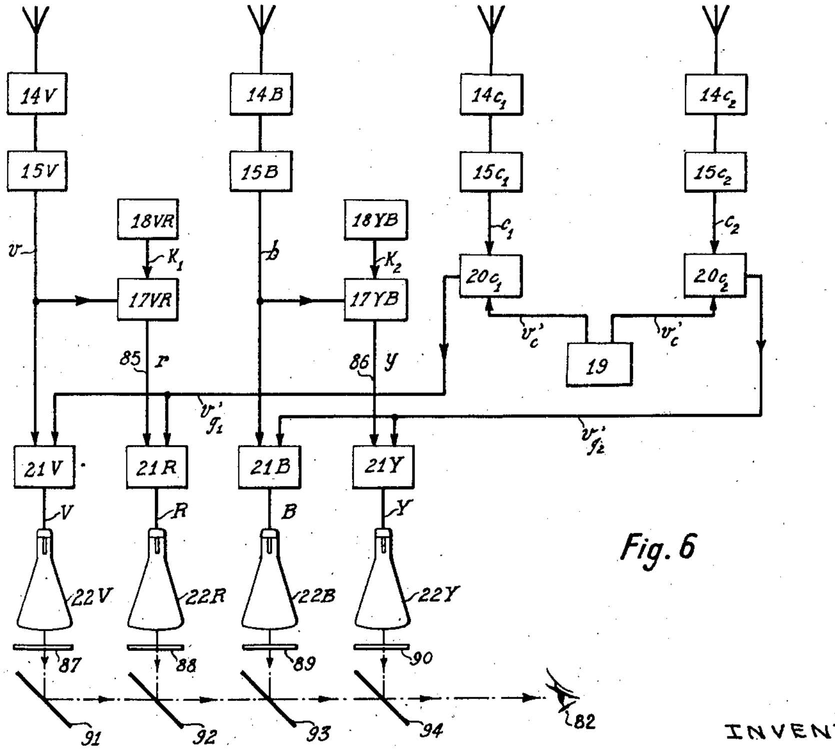

The reception device is represented in Figure 6.

14V, 14B, 14$c_1$ and 14$c_2$ are the receivers corresponding respectively to 10V, 10B, 10$c_1$ and 10$c_2$, i. e. to the green signal, to the blue signal, and to two correction signals $c_1$ and $c_2$.

15V and 15B are two amplifiers identical to amplifiers 15V and 15B of Figure 4 and 15$c_1$ and 15$c_2$ are two amplifiers identical to amplifier 15C of this same figure.

18VR is a constant voltage source giving the voltage $K_1$.

18YB is a constant voltage source giving the voltage $K_2$.

17VR is a subtracting circuit which sets the voltage $v$ in opposition to the voltage $K_1$ and which feeds the voltage $r$ to lead 85.

17YB is a subtracting circuit which sets the voltage $b$ in opposition to the voltage $K_2$ and which feeds the voltage $y$ to the circuit 26.

21V and 21R are the amplifiers identical to amplifiers 21V, 21R and 21B of Figure 4 the gain $g_1'$ of which stands in a linear relationship with $v_{g_1}=v_c'-c_1$ supplied by 20$c_1$ which subtracts the signal $c_1$ and the voltage $V_c'$ supplied by 19.

21Y and 21B are amplifiers identical to amplifiers 21V, 21R, and 21B of Figure 4 the gain $g_2'$ of which stands in a linear relationship with $v_{g_2}'=v_c'-c_2$ supplied by 20$c_2$, which subtracts the signal $c_2$ and the voltage $V_c'$ supplied by 19.

22V, 22R, 22Y, and 22B are four kinoscopes having screens selectively producing light in the green, red, yellow and blue portion of the spectrum and provided with filters 87, 88, 89 and 90 of the same colours. The four colour images are recombined into a single image through wholly silvered mirror 91 and partially silvered mirrors 92, 93 and 94, and they are seen in exact registration by the observer's eye 82.

Departing from the foregoing tetrachromic device in which only two video-frequency signals and two correction signals are transmitted, it is possible, according to the invention, to transmit a trichromic image by means of one single video-frequency signal and two correction signals.

Figure 8:
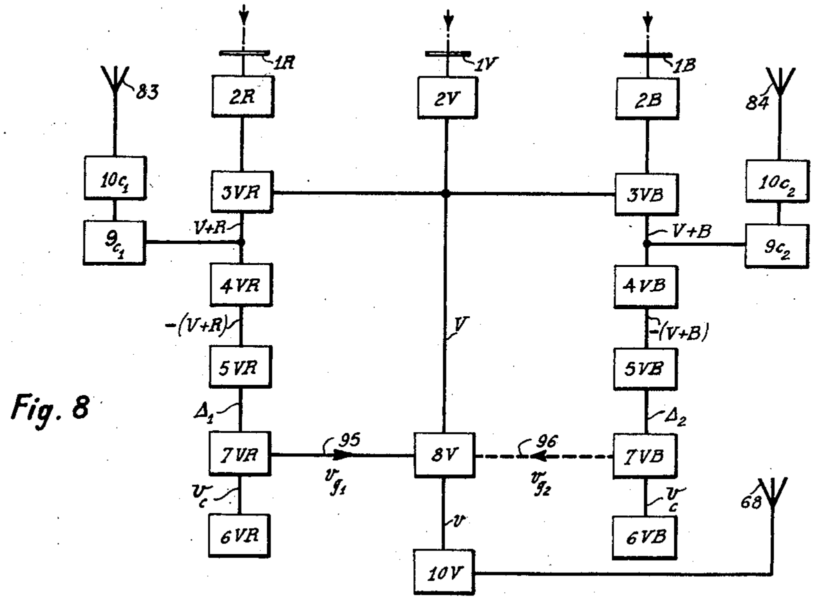
Figures 8 and 9 represent the transmitter and the receiver devices relative to the third proposed system.

It will be assumed that the filters 1V and 1Y in Figure 5 become identic, i. e. yellowish green; one comes then to a transmission device of Figure 8.

1R, 1V, 1B are chromatic filters corresponding respectively to the red, yellowish-green and blue colours.

2R, 2V, 2B are the cameras comprising video-frequency amplifiers.

3VR and 3VB are adding circuits enabling to sum up, on the one hand, the red and the yellowish-green components, and, on the other hand, the blue and the yellowish-green components.

4VR and 4VB are the phase inverter circuits enabling to change the polarity respectively of the signals $(V+R)$ and $(V+B)$.

5VR and 5VB are circuits identical to 5 in Figure 2, and which supply the signals $\Delta_1$ and $\Delta_2$ respectively inversely proportional to the input signals $-(V+R)$ and $-(V+B)$.

6VR and 6VB are constant voltage sources giving the fixed voltage $v_c$ equal to the cut-off voltage of the input stages of amplifier 8V.

7VR and 7VB are subtracting circuits which subtract $\Delta_1$, from $V_c$ on the one hand and $\Delta_2$ from $V_c$ and, on the other hand, so as to obtain:

$$v_{g_1}=v_c-\Delta_1$$
$$v_{g_2}=v_c-\Delta_2$$

8V is an amplifier identical to the amplifier 8V in Figure 2, the gain $g_1$ (or $g_2$) of which controlled by $v_{g_1}$ (or $v_{g_2}$) stands in a linear relationship with $v_{g_1}$ (or $v_{g_2}$), i. e. in a hyperbolic relationship with $F_1$ or $F_2$. One of the voltages $v_{g_1}$, or $v_{g_2}$ is used as a control signal of the amplifier 8V. In Figure 8 it has been assumed that the amplifier 8V was controlled by $v_{g_1}$ (full-line lead 95), but it is just as possible to have it controlled by $v_{g_2}$ (dashed line lead 96).

10V is a conventional television device which forms the green channel, and which feeds the aerial 68.

9$c_1$ and 9$c_2$ are low-pass filters to which are respectively fed the output signals 3VR and 3VB, and which only let pass the variations of $F_1$ (the video signal relative to the pair red and yellowish-green) and of $F_2$ (the video signal relative to the pair blue and yellowish-green), the frequency of which is lower than a certain cut-off frequency of, say, 50,000 c./s., for instance.

10$c_1$ and 10$c_2$ are two transmitters provided with a reduced bandwidth corresponding to only few blots per image, and transmitting respectively the signal $c_1$ representing the difference between $F_1$ and $F_{10}$, and the signal $c_2$ representing the difference between $F_2$ and $F_{20}$. 10$c_1$ feeds the aerial 83, and 10$c_2$ feeds the aerial 84. Obviously, $c_1$ and $c_2$ can form, as heretofore, audio channels, if said audio channels have sufficiently wide bandwidth.

Figure 9:
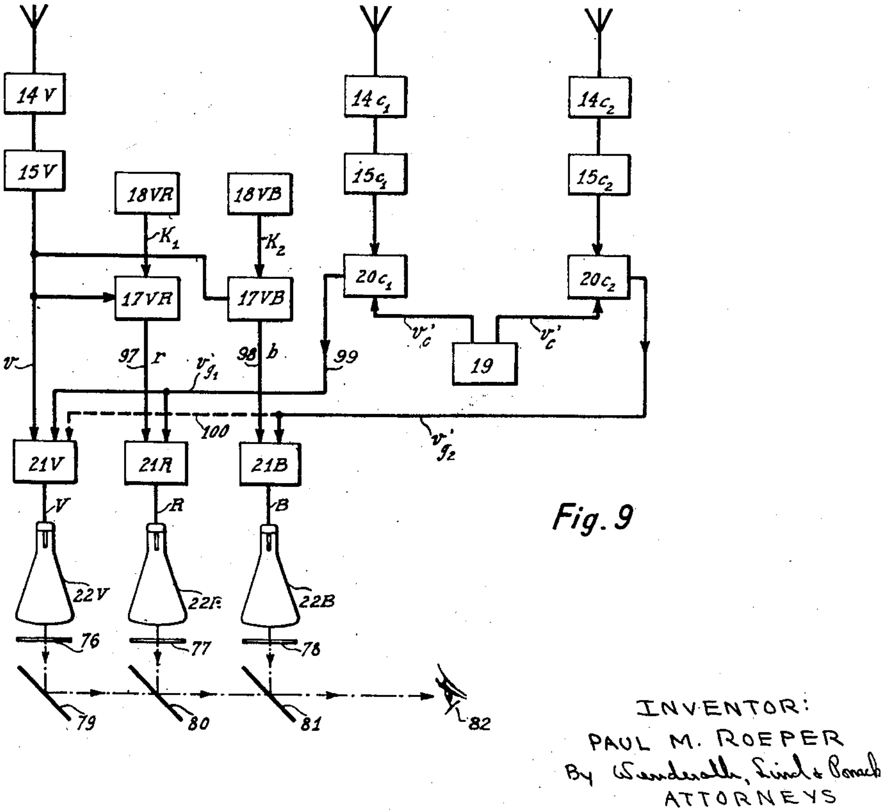

The reception device is represented in Figure 9.

14V, 14$c_1$, 14$c_2$ are the receivers corresponding respectively to $10_v$, $10_{c_1}$, $10_{c_2}$, i. e. to the green signal, and to the two correction signals $c_1$ and $c_2$.

$15_v$ is an amplifier identical to amplifier $15_v$ of Figures 4 and $15C_1$ and $15C_2$, are amplifiers identical in structure to amplifier $15_c$ of the same figure.

$18_{VR}$ is a constant voltage source giving the voltage $K_1$.

$18_{VB}$ is a constant voltage source giving the voltage $K_2$.

$17_{VR}$ is a subtracting which sets the voltage $v$ in opposition to the voltage $K_1$ and supplies the voltage $r$ to the lead 97.

$17_{VB}$ is a subtracting circuit which sets the voltage $v$ in opposition to the voltage $K_2$ and supplies the voltage $b$ to lead 98.

$21_V$ and $21_R$ are the amplifiers the gain $g_1'$ of which stands in a linear relationship with $v_{g_1}'=v_c'-c_1$ fed by $20_{c_1}$ and which substracts the voltage $c_1$ and the signal $v_c'$ supplied by 19.

$21_B$ is an amplifier the gain $g_2'$ of which stands in a linear relationship with $v_{g_2}'=v_c'-c_2$ supplied by $20_{c_2}$ which substracts the voltage $c_2$ and the signal $v_c'$ supplied by 19.

It has been assumed that in the transmission device lead 95 was connected, and lead 96 was out of connection. In this case the amplifier $21_V$ is controlled by the signal $v_{g_1}'$ through lead 99. If, on the contrary, lead 95 of the transmission device were out of connection, and the lead 96 were connected, the amplifier $21_V$ would be controlled by the signal $v_{g_2}'$ through the dashed lead 100.

$22_V$, $22_R$, $22_B$ are three kinescopes identical to those images identical to that of Figure 4.

Figure 10:
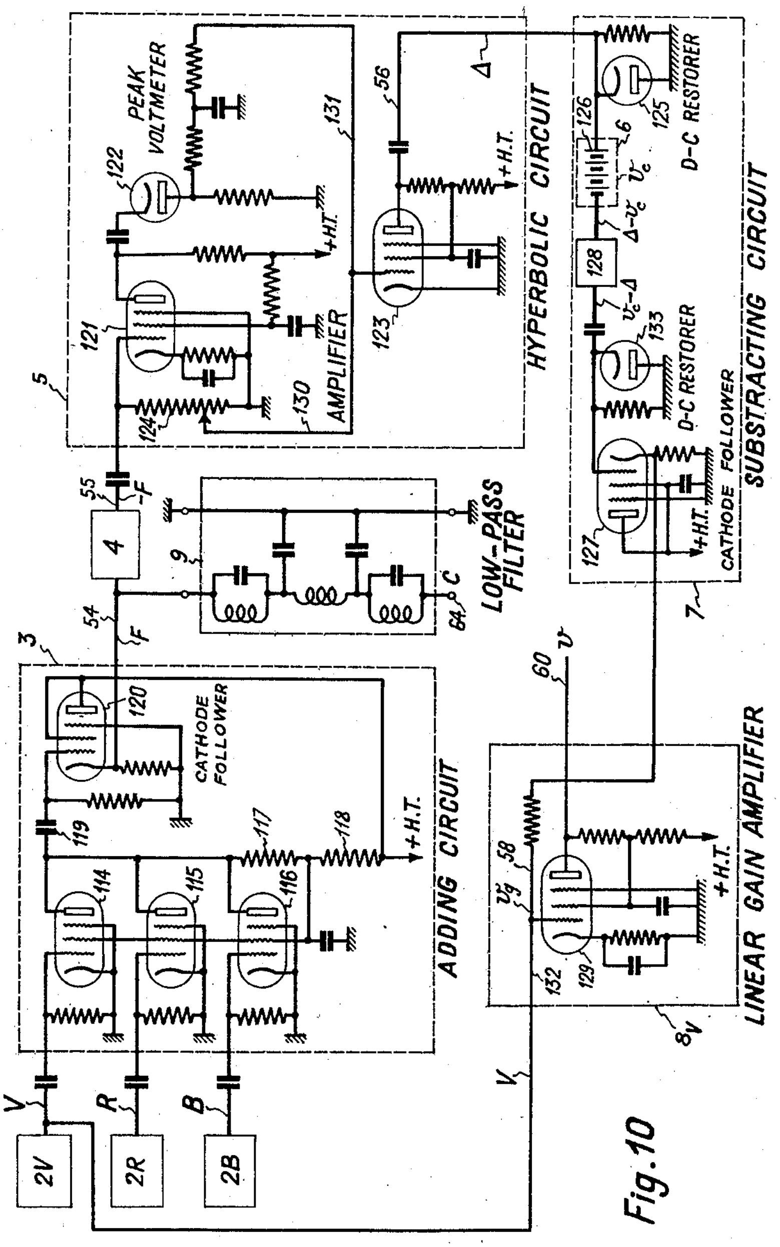
Figure 10 represents the detailed diagram of circuits inserted in Figures 2, 4, 5, 6, 8 and 9.

Figure 10 represents in detail the chain of circuits from the cameras of Figure 2 to the entry into the emitter $10_V$.

The three signals V, R and B are applied to the adding circuit 3. This circuit comprises three amplifying tubes 114, 115 and 116 having a common charge, constituted by the resistances 117 and 118 mounted in their three anode circuits. The potential drop in 117—118 is applied across coupling condenser 119 and a cathode follower 120. The signal obtained from the connection of outlet 54 is the usual black and white signal F.

This signal F is first applied to a low pass filter 9 which does permit only the lower frequencies to pass up to a certain cut-off, for example 50,000 c./s. The filtered signal is disposed through connection 64 and is sent through emitter $10_C$. Signal F is equally applied to the grid of the conventional tube 4, not shown in detail, and a video signal F is obtained in the anode circuit of this tube which is of inverse polarity and is disposable through connection 55.

5 represents within the assembly a hyperbolic circuit to furnish a signal which is inversely proportional to F. It comprises a bias circuit composed of an amplifier 121 and a peak voltmeter 122. One obtains a rectified voltage proportional to the amplitude of signal F on leaving from the connection of 131 of the peak voltmeter.

132 is a tube having a control-grid voltage-plate current characteristic curve of substantially hyperbolic shape, and it may be for example a tube of the type 6SG7 as previously shown. The control grid of tube 123 receives by means of connection 130, video signal F derived from potentiometer 124, and by means of connection 131, the rectified voltage produces by D. C. voltage reinsertion an automatic biasing of tube 123. Signal $\Delta$ is disposable through connection 56.

7 is a subtracting circuit comprising a diode restorer circuit 125, a battery 126 having electromotive force $v_c$, a phase inverter tube 128, a second diode restorer circuit 123 and cathode follower 127. The battery is placed in series with the entry connection of tube 128 and in the usual manner serves to substract voltage $\Delta$ from voltage $v_c$.

$8_V$ is a linear gain amplifier, comprising essentially tube 129, having a parabolic control-grid voltage plate current characteristic curve. 129 may be for example a 6AU6 tube as previously shown. The control-grid of tube 129 receives the video signal V through connection 132 and also signal $v_g$ the gain control by means of connection 58. The function of tube 129 has been explained apropos of Figure 3*b*. Signal V is disposable by connection 60 and is sent to amplifier $10_V$.

The adding circuit of Figure 10 may be employed as circuit 16 in Figure 4, circuit $3_{VR}$ and $3_{YB}$ in Figure 5, $3_{VR}$ and $3_{VB}$ in Figure 8 but with two entries only in lieu of three as illustrated in Figure 10.

Circuits 17 and 20 of Figure 4, $7_{VR}$ and $7_{YB}$ of Figure 5, $17_{VR}$ and $17_{YB}$ of Figure 6, $7_{VR}$ and $7_{VB}$ of Figure 8, and $17_{VR}$ and $17_{VB}$ of Figure 19 may be used as the subtracting circuit of Figure 10.

Linear gain amplifiers $21_V$, $21_R$ and $21_B$ of Figure 4, $21_V$, $21_R$, $21_B$ and $21_Y$ of Figure 6, $21_V$, $21_R$ and $21_B$ of Figure 9 are identical to amplifier $8_V$ of Figure 10 but instead of having the grid bias voltage $V_g$ (inversely proportional to F) this voltage is $V_g'$ (proportional to F).

Various alterations and modifications of the present invention may become apparent to those skilled in the art and it is desirable that any and all such modifications and alterations be considered within the purview of the present invention except as limited by the hereinafter appended claims.

What I claim is:

1. System for colour television comprising in combination scanning means for exploring simultaneously elemental areas of the object to be shown at distance in a plurality of colours associated in polychromic groups, and for giving video signals in each of said colours, means for amplifying the video signals of a group of colours, with a gain inversely proportional to the sum of said video signals of the group, and for producing of modified video signals the sum of which would be constant for a group, means for measuring audio signals equal to the average variation with respect to the time of the sum of video signals of each group, electrical means for transmitting directly to a distant station a number of modified signals equal to the total number of colours minus the total number of the colour groups, electrical means for transmitting directly to the same station each of the audio signals representing the average variation of the sum of video signals of each group, means for receiving the modified image video signals and the audio signals, means for subtracting of the sum of the modified video signals transmitted in each group from the voltage equal to the constant sum of the modified video signals of the group, and for restoring the modified video signal non transmitted in each group, means for amplifying the transmitted modified video signals and the restored modified video signal of each group with a gain proportionate to the audio signal relative to said group, and for obtention of signals the sum of which will no more be constant in each group, means for reproducing the coloured images by the signals coming from the receiver amplifiers the gain of which is proportional to the audio signal, and optical means for superposing these images.

2. System for tricolor television comprising in combination scanning means for exploring simultaneously elemental areas of the object to be shown at distance in three colours, and for giving video signals in each of said colours, means for amplifying each of the three video signals with a gain inversely proportional to their sum, means for obtaining of the three modified video signals the sum of which be constant, means for measuring an audio signal equal to the average variation with respect to the time of the sum of the three video signals, electrical means for transmitting directly to a distant station two modified video signals, electric means for transmitting directly to the same station the aforementioned audio signal, means for receiving the two modified video signals, and the video signal, means for subtracting the sum of the two transmitted modified video signals from a voltage equal to the constant sum of the three modified video signals, and for restoring the third not transmitted modified audio signal, means for amplifying the two transmitted modified video signals, and the restored modified video signal with the gain proportional to the audio signal, and means for obtaining of the three signals the sum of which be no more a constant quantity, means for reproducing three coloured images, with the signals coming from the receiver amplifiers having their gain proportional to the audio signal, and optical means for superposing these images.

3. System for tetracolor television comprising in combination scanning means for exploring simultaneously elemental areas of the object to be shown at distance in four colours associated pairwise and for giving video signals in each of said colours, means for amplifying the two video signals of each of the two groups with the gain inversely proportionate to the sum of said video signals of the group under consideration, and for obtaining two groups of two modified signals the sum of which be constant in each group, means for measuring two audio signals equal to the average variation with respect to the time of the sum of the video signals of each of the two groups, electrical means for transmitting directly to a distant station two modified video signals at the rate of one per group, electrical means for transmitting directly to the same station the two audio signals, means for receiving the two transmitted modified video signals and the two audio signals, means for subtraction of each of the transmitted modified video signals from a voltage equal to the constant sum of the two modified video signals of its group and for restoring the not transmitted modified video signal of each of the two groups, means for amplifying the two transmitted modified video signals at the rate of one per group and the two restored modified video signals at the rate of one per group with a gain proportionate to the audio video signal relative to the group to which it belongs and for obtaining video signals the sum of which be no more constant in each group, means for reproducing four coloured images with the signals coming from the four reception amplifiers the two first of which have a gain proportionate to the audio signal relative to the first group, and the two last ones have a gain proportionate to the audio signal relative to the second group, and optical means for superposing these images.

4. System for tricolor television comprising in combination scanning means for exploring simultaneously elemental areas of the object to be shown at distance in three colours associated pairwise in two groups, one of the colours being common to the two groups, and for giving video signals in each of said video signals, means for amplifying that of the colours of each group which is not common to the two groups, with a gain inversely proportional to the sum of the two signals of the group, and for obtaining two groups of two modified video signals one of which is common in each group and the sum of said modified video signal being constant in one of the groups and substantially constant in the other group, means for measuring the average variation with respect to the time of the sum of the video signals of each of the two groups, electrical means for transmitting directly to a distant station the modified video signal common to the two groups, electrical means for transmitting directly to the same station the two audio signals, means for receiving the single transmitted modified signal and the two audio signals, means for subtraction of the transmitted modified video signal, on the one hand, from the voltage equal to the constant sum of the two modified video signals of the first group, and, on the other hand, from the voltage equal to the constant sum of the two modified video signals of the second group, and for restoring the not transmitted modified signal of each of the two groups, means for amplifying the two modified restore signals at the rate of one per group, with a gain proportional to the audio signal relative to the group to which it belongs, and the transmitted common modified signal, with a gain proportional to the audio signal of one of the groups to which it belongs, this group being the same as in the transmitter, and for obtaining signals the sum of which be no more constant in each of the groups, means for reproducing the three coloured images with the signals coming from the three reception amplifiers, and optical means for superposing these images.

PAUL M. ROEPER.

REFERENCES CITED

The following references are of record in the file of this patent:

UNITED STATES PATENTS

| Number | Name | Date |
|---|---|---|
| 2,335,180 | Goldsmith | Nov. 23, 1943 |
| 2,492,926 | Valensi | Dec. 27, 1949 |